May 10, 1927.  
W. MALM  
1,628,258  
SAFETY DEVICE FOR MOTION PICTURE PROJECTING MACHINES  
Filed May 21, 1925
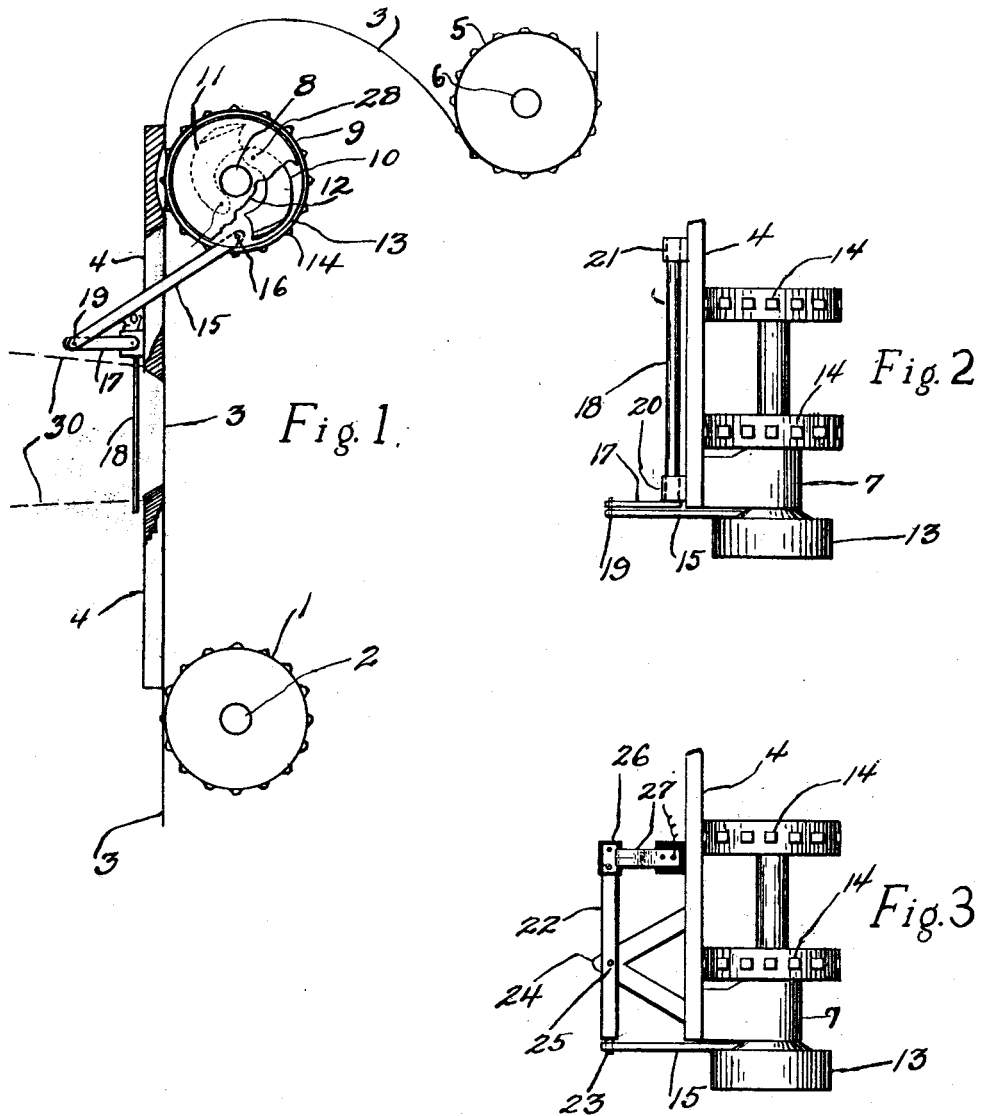
William Malm
INVENTOR.

Patented May 10, 1927.

1,628,258

UNITED STATES PATENT OFFICE.

WILLIAM MALM, OF NEW ORLEANS, LOUISIANA.

SAFETY DEVICE FOR MOTION-PICTURE-PROJECTING MACHINES.

Application filed May 21, 1925. Serial No. 31,870.

This invention relates to safety devices for motion picture projecting machines, and particularly to mechanism for eliminating the chief causes of film fires.

In motion picture machines, as is well known, the motion picture film is passed across the aperture of the projector, through which the projecting light passes. Owing to the intensity of said light, projectors of the present-day type are provided with a shutter which automatically cuts off said light from the film, when said film is moved slowly enough to become ignited. This shutter, however, is directly controlled by the speed of the driving mechanism of the projector, and does not protect the film from becoming ignited in instances where the film becomes at rest, due to torn film margins, severed splices, or similar faults.

The object of my present invention is to provide means operating automatically on the breaking of the film, the failure of the feed mechanism, or from any other cause of the film remaining stationary for an abnormal length of time, to cut off the light from the aperture, either by means of an auxiliary shutter or by an auxiliary switch automatically stopping the driving mechanism actuating the regular shutter.

A further object of my invention is to provide means for controlling said auxiliary shutter or auxiliary switch directly by the speed of the motion picture film as it passes the aperture, and not solely dependent upon the speed of the main driving mechanism of the machine, thereby protecting the film from igniting, irrespective of circumstances, and rendering the projector practically fire proof.

Other and ancillary objects of my invention will appear hereinafter.

In the accompanying drawings, Figure 1 is a side view of film passing over aperture plate of projector including my improved shutter and driving means therefor. Figure 2 is a plan view of shutter and driving means shown in Figure 1. Figure 3 is a plan view similar to Figure 2 with a slight modification, showing how the driving means may be made to actuate an auxiliary cut-off switch in place of the shutter.

Referring to the drawings, Figures 1 to 3, inclusively, 1 is the sprocket wheel fixed on shaft 2, which intermittently feeds the film 3 past the aperture in plate 4. 5 is the upper feed sprocket, fixed on shaft 6, which maintains loop in film 3.

7 is a bearing not shown in Figure 1, for simplicity supporting shaft 8 upon which is fixed sprocket 9 and internal members 10, 11, and 12, of friction clutch assembly comprised of said internal members and shell 13. Sprocket teeth 14 of sprocket 9 mesh with sprocket holes in film 3. Lever 15 is loosely attached on clutch shell 13 by pin 16, and is also loosely attached to arm 17 of shutter 18 by pin 19. Said shutter 18 is supported by bearings 20 and 21, and cuts off light 30 from film 3.

Lever 15, in Figure 3, is loosely attached to clutch shell 13, as is lever 15 in Figure 2, and is also loosely attached to lever 22 by pin 23. Lever 22 is loosely attached to bracket 24 by pin 25, said bracket being fixed on plate 4. Fixed on lever 22 is an insulated contact plate 26 engaged with contact spring 27 which is insulated and fixed on plate 41. 26 and 27 comprise a switch intended to be part of, and make and break the motor circuit of the projector.

While my invention has been illustrated in what is considered its best application, it may have other embodiments without departing from its spirit. It is not therefore, limited to the structures shown in the drawings.

The operation of the device will be obvious from the above description. The relation between shutter 18 and clutch shell 13 is such, that when film 3 is moved along plate 4 by sprocket 1, and like movement is imparted to sprocket 9, centrifugal force causes members 10 and 11 (loosely attached to pins 28 and 29, respectively, which are fixed on plate 12) to rotate clutch shell 13 thereby lifting shutter 18. If for any reason whatsoever, the film 3 should become at rest at point of contact with sprocket 9, due to torn film margins, severed splices or similar faults, then sprocket 9 will fail to rotate, thereby releasing clutch shell 13 and allowing shutter 18 to fall, thereby cutting off light 30 from film 3.

Figure 3 shows how similar movement of the clutch shell 13 actuated under conditions above described, can be made to open the circuit of the motor which drives the projector, thereby actuating the regular safety shutter found on the present day type of machines.

What I claim as new and desire to secure by Letters Patent, is:

1. In a motion picture machine, the combination with a motion picture film, of means for automatically protecting said film from fire, comprising an automatic light shutter actuated by a suitable clutch device, said clutch device being driven by an auxiliary sprocket wheel, said sprocket wheel meshing with said film and moving in synchronism with said film and located at a suitable point between the intermittent driving sprocket and upper feed sprocket of said machine.

2. In a motion picture machine, the combination with a motion picture film, of means for automatically protecting said film from fire, comprising an automatic safety shutter located at a point between source of projecting light and said film, and means for causing said shutter to cut off said light from said film whenever said film should become at rest in path of said light for any abnormal length of time; comprising a suitable clutch device, said clutch device being driven by an auxiliary sprocket wheel, said sprocket wheel meshing with said film and moving in synchronism with said film and located at a suitable point between the intermittent driving sprocket and upper feed sprocket of said machine.

3. In a motion picture machine, the combination with a motion picture film, of means for automatically protecting said film from fire, comprising a suitably located electric switch controlling motor circuit of said machine, said switch being actuated by means of a series of levers, and a suitable clutch device, said clutch device being driven by an auxiliary sprocket wheel, said sprocket wheel meshing with said film and moving in synchronism with said film and located at a suitable point between the intermittent driving sprocket and upper feed sprocket of said machine.

4. In a motion picture machine, the combination with a motion picture film, of means for automatically protecting said film from fire, comprising a suitably located electric switch controlling motor circuit of said machine, and means for causing said switch to cut off motor circuit of said machine whenever said film should become at rest in path of projecting light for any abnormal length of time, comprising a suitable clutch device, said clutch device being driven by an auxiliary sprocket wheel, said sprocket wheel meshing with said film and moving in synchronism with said film and located at a suitable point between the intermittent driving sprocket and upper feed sprocket of said machine.

WILLIAM MALM.